(12) United States Patent
Dove et al.

(10) Patent No.: US 9,071,788 B2
(45) Date of Patent: Jun. 30, 2015

(54) VIDEO VEHICLE ENTERTAINMENT DEVICE WITH DRIVER SAFETY MODE

(71) Applicant: Echostar UK Holdings Limited, Keighley (GB)

(72) Inventors: Antony Michael Dove, West Yorkshire (GB); Neale Hall, Silsden (GB)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 13/739,878

(22) Filed: Jan. 11, 2013

(65) Prior Publication Data

US 2013/0184932 A1 Jul. 18, 2013

(30) Foreign Application Priority Data

Jan. 13, 2012 (EP) ..................................... 12151155

(51) Int. Cl.
*G06F 7/00* (2006.01)
*H04N 5/44* (2011.01)
*H04N 21/414* (2011.01)
*H04N 21/422* (2011.01)
*H04N 21/439* (2011.01)
*H04N 21/454* (2011.01)
*H04N 21/462* (2011.01)
*H04N 21/81* (2011.01)

(52) U.S. Cl.
CPC ........... *H04N 5/44* (2013.01); *H04N 21/41407* (2013.01); *H04N 21/41422* (2013.01); *H04N 21/42202* (2013.01); *H04N 21/439* (2013.01); *H04N 21/4542* (2013.01); *H04N 21/4621* (2013.01); *H04N 21/8106* (2013.01)

(58) Field of Classification Search
USPC ....................................................... 701/36, 49
See application file for complete search history.

(56) References Cited

U.S. PATENT DOCUMENTS

| 5,717,392 | A | 2/1998 | Eldridge |
| 6,711,379 | B1 * | 3/2004 | Owa et al. .................... 455/3.01 |
| 2009/0058623 | A1 | 3/2009 | Mino |

FOREIGN PATENT DOCUMENTS

| BE | 1008888 A6 | 8/1996 |
| EP | 1001627 A1 | 5/2000 |
| WO | 2005048598 A1 | 5/2005 |
| WO | 2010099591 A1 | 9/2010 |

OTHER PUBLICATIONS

European Patent Office "Extended European Search Report" dated May 3, 2012 for European Patent Appln. No. 12151155.4.

* cited by examiner

*Primary Examiner* — Kim T Nguyen
(74) *Attorney, Agent, or Firm* — Ingrassia Fisher & Lorenz, P.C.

(57) ABSTRACT

This document relates to a vehicle entertainment device 1 having a driver safety mode and an enhanced audio playback function. The device 1 detects whether the vehicle in which the entertainment device is situated is in motion, or if the driver is preparing to drive the vehicle momentarily. If either of these conditions is detected, the processor 20 acts to disable the video playback on the screen 3 of the entertainment device. At the same time, the processor 20 causes an audio descriptor track corresponding to the disabled video to be played through the speakers 4 of the entertainment device. The audio descriptor track is in addition to the main audio track accompanying the video and provides a verbal description of the content of the video.

17 Claims, 3 Drawing Sheets

VIDEO VEHICLE ENTERTAINMENT DEVICE WITH DRIVER SAFETY MODE

CROSS-REFERENCES TO RELATED APPLICATIONS

This Application claims priority to European Patent Application No. 12151155.4, filed Jan. 13, 2012.

FIELD OF THE INVENTION

The invention relates to a video vehicle entertainment device, such as an in-vehicle audio/video (AV) player, and in particular, to an entertainment device with improved content delivery and safety features.

BACKGROUND OF THE INVENTION

It is increasingly common to install video entertainment devices in vehicles, such as automobiles, often located on the vehicle dashboard so that the driver and the front passenger can view them from their seats. Devices such as these can be used safely while the automobile is stationery, such as when it is parked and the driver does not have to concentrate on other road users and pedestrians. However, if the device was to be used to playback video when the automobile is in motion, then there is a risk of distraction to the driver and danger to the automobile occupants and other road users.

Whilst most drivers would likely opt not to drive with the video playing, there are situations perhaps near the end of a programme when a driver may be tempted to begin driving with the video playback still activated. The driver may be late for example and need to depart in order to make an appointment. This risk is higher if the driver expects the programme to end shortly and considers the risk of distraction from the remaining minutes of the programme to be small.

We have therefore appreciated that there is a need for a video vehicle entertainment device that offers improved safety and playback features.

SUMMARY OF THE INVENTION

The invention is defined in the independent claims to which reference should now be made. Advantageous features are set forth in the dependent claims.

In a first embodiment, a video entertainment device for a vehicle is provided. The device comprises: a sensor for detecting that the vehicle is in motion, or is about to be driven; and a processor for activating a drive safety mode when the sensor determines that the vehicle is in motion, or is about to be driven; wherein in the drive safety mode video playback is disabled and audio playback is switched to include an audio descriptor track, the audio descriptor track at least partly describing the non-verbal content of the disable video playback.

The video entertainment device automatically switches to the drive safety mode without driver input, thereby removing any visual distraction from the driver's field of vision. At the same time, the audio descriptor track is enabled so that the driver can continue to enjoy the video programme through an audio only experience. The audio descriptor track and the main audio track for the video therefore provide both any music, sound effects, and any speech of the characters in the programme, as well as a verbal description of what the disabled video scene represents.

In one example, the sensor is coupled to the vehicle speed-o-meter, and the sensor determines that the vehicle is in motion if the speed-o-meter indicates a non-zero speed reading. In an alternative example, the sensor is coupled to the vehicle speed-o-meter, and the sensor determines that the vehicle is in motion if the speed-o-meter indicates a speed reading that is above a threshold value. The threshold value can be very small, such as just a few miles per hour.

In one example, the sensor is coupled to the vehicle parking brake, and the sensor determines that the vehicle is about to be driven, if the sensor detects that the parking brake has been released.

The sensor may also be coupled to the vehicle gear system, allowing the sensor to determine that the vehicle is about to be driven, if the sensor detects that the gear system has been shifted out of neutral into gear.

The sensor may be coupled to a GPS (Global Positioning System) device. By obtaining a speed reading form the GPS device, or by recording GPS positions at regular intervals, the sensor may determine directly if the vehicle is in motion.

In one example, the processor deactivates the drive safety mode when the sensor determines that the vehicle has been stationary for a predetermined amount of time. This avoids the video playback being reactivated when the vehicle is temporarily stopped at traffic signals or intersections. The predetermined amount of time should therefore be at least a few minutes.

In a further example, the video entertainment device comprises a user input mechanism by which a user can deactivate the drive safety mode when the vehicle is stationary.

In one example, the video entertainment device may be installed in a vehicle. In alternative embodiments, the device may be a mobile terminal Mobile terminals can include mobile phones, tablet computers, personal digitial assistants, portable computers or laptops, portable optical disc players, such as DVD or Blu Ray players, and games consoles.

In a second embodiment, a computer implemented method of controlling the screen and speakers of video entertainment device for a vehicle is provided. The method comprises: detecting with a sensor whether the vehicle is in motion, or is about to be driven; activating a drive safety mode when the sensor determines that the vehicle is in motion, or is about to be driven; wherein in the drive safety mode video playback is disabled and audio playback is switched to include an audio descriptor track, the audio descriptor track at least partly describing the non-verbal content of the disable video playback.

In a third embodiment, there is provided a portable video entertainment device comprising: a screen for displaying video content and speakers for outputting audio content; a Global Positioning System (GPS) sensor for determining the location of the device; and a processor, wherein the processor is operable to: determine from the GPS sensor if the portable video entertainment device is in motion; if the device is in motion, to disable video playback on the screen of the device and switch the audio output to include an audio descriptor track, the audio descriptor track at least partly describing the non-verbal content of the disable video playback.

BRIEF DESCRIPTION OF THE DRAWINGS

The invention will now be described by way of example and with reference to the drawings in which.

DETAILED DESCRIPTION OF EXAMPLE EMBODIMENTS OF THE INVENTION

Figure 1:
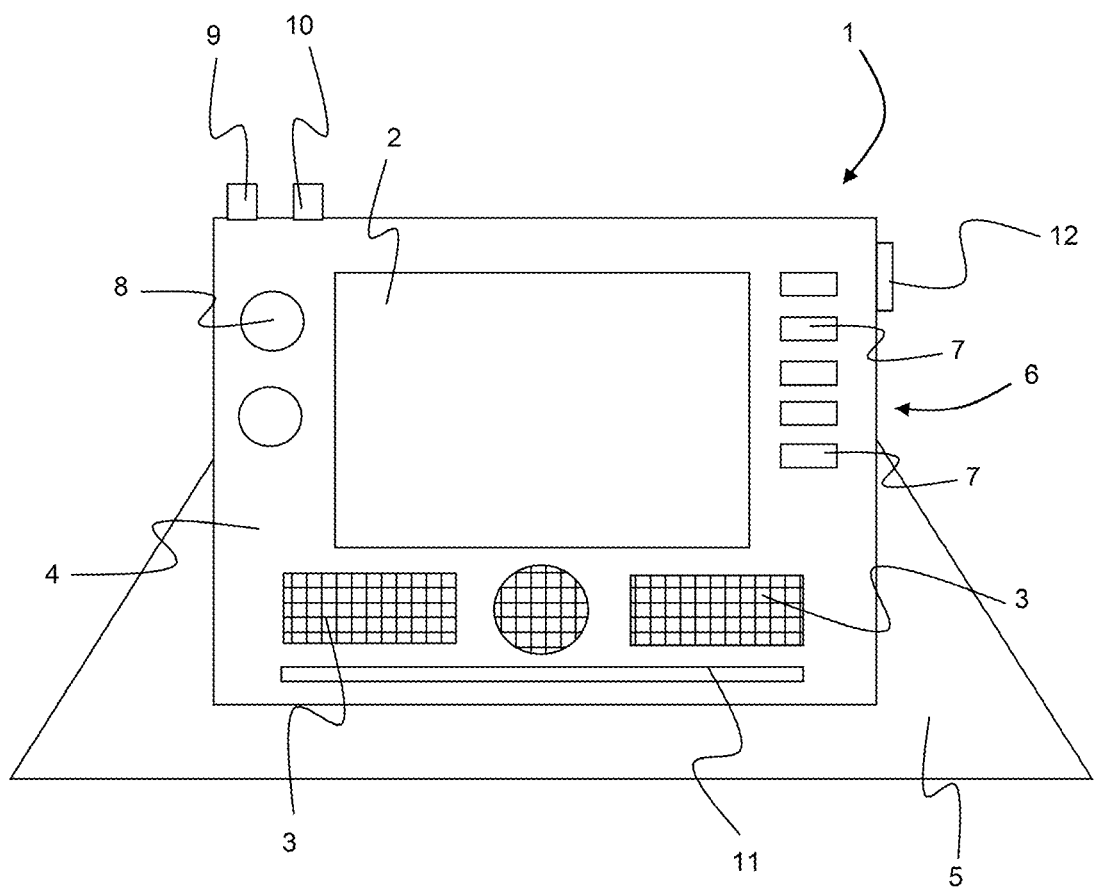
FIG. 1 is a schematic illustration of the exterior of an in-vehicle entertainment device.

A first example provides an audio/video entertainment device 1 for a vehicle. The entertainment device 1 comprises a screen 2 for playback of video content, one or more speakers 3 for playback of audio content, and a housing 4 for supporting the screen 4 and speakers 3 and for conveniently allowing the device to be mounted inside a vehicle at a suitable location. Suitable locations include above or in the dashboard 5, above or in an armrest or seat divider adjacent the driver or front passenger seats, or suspended from the roof of the vehicle driver adjacent the driver or front passenger seats. The device also includes a user interface 6 in the form of physical buttons 7 or dials 8 located on the housing, or, in examples where a touch-screen is used, via on-screen equivalents displayed by a device controller on the screen of the device. The entertainment device also includes one or more video content input mechanisms, such as an antenna 9 for receiving broadcast television signals, an antenna 10 for receiving mobile phone network signals, an optical disc tray and player 11, for playing video content pre-recorded onto optical discs such as DVDs or Blu-Rays, and a memory device input port 12, such as a Universal Serial Bus connection. It will be appreciated that the entertainment device can receive video content via any and all of the video content input mechanisms.

Figure 2:
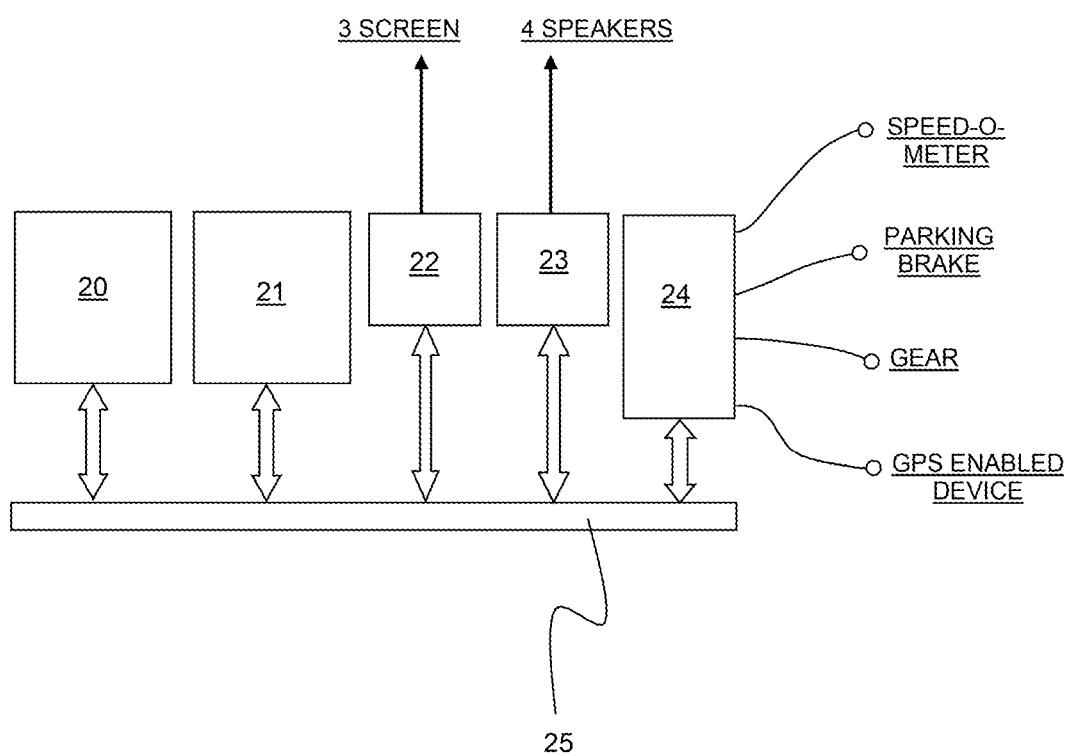
FIG. 2 is a schematic illustration of the in-vehicle entertainment device of FIG. 1.

FIG. 2 is a schematic illustration of the in-vehicle entertainment device 1 of FIG. 1. The device includes a processor 20, a memory 21, screen 22 and speaker 23 drivers for controlling output to the screen 3 and speakers 4 respectively, a vehicle condition sensor 24 for detecting an operating condition of the vehicle and a data bus 25 providing communication between the respective elements.

The vehicle condition sensor 24 determines an operating condition of the vehicle, such as whether the vehicle is in motion, the speed of the vehicle, whether the vehicle is in gear or is in neutral, whether the parking brake is applied and so on. The output of the sensor may therefore be a simple logical output, such as TRUE or FALSE for the conditions 'in-motion', 'in-gear', 'parking brake applied', or may be a scalar value representative of speed. The sensor output is provided to the processor 20 via the data bus 25, which based on the sensor output controls the video and audio output transmitted to screen 3 and speaker 4 by the screen 22 and speaker driver 23. As indicated in FIG. 2, the vehicle condition sensor 24 may be connected to typical vehicle systems such as the speedometer, the gear train, parking brake, brake pedals and provide sensor outputs to the processor 20 accordingly. In other embodiments the vehicle condition sensor may be configured to connect to a GPS enabled device, such as an in-vehicle navigation system having a GPS (Global Positioning System), or indeed may comprise a GPS itself. The GPS system can be used to give an accurate indication that the vehicle is in motion, without having to connect the entertainment device to the vehicle systems.

In the first instance, the processor 20 monitors the vehicle condition sensor 24 to determine whether the vehicle is currently being driven (is presently in motion), or whether the driver is preparing to drive the vehicle (presently stationary but about to driven). Indicators that the driver is preparing to drive the vehicle include: a detection that the vehicle is in gear, even if coupled with a zero vehicle speed indication, or an indication that the parking braking is still applied; or alternatively, an indication that the parking brake has been released, even if coupled with a zero vehicle speed indication and an indication that the vehicle is in neutral.

If the processor 20 determines a condition indicating that the driver is about to drive the vehicle, and the entertainment device 1 is in use, a number of actions may be taken. For driving safety, the processor may 20 for example suppress the video playback on the entertainment device 1, so that there is no risk of the vehicle driver being distracted by the video playback. Alternatively, as the vehicle is deemed to be not yet moving, a warning message may simply be displayed on screen indicating that the video will be turned off shortly, or as soon as the vehicle is detected as being in motion.

If the processor determines that the vehicle is in motion and the entertainment device is in use, then the processor will automatically disable the video playback for safety reasons. In this condition, the main audio track may however be left playing though the speakers.

In examples of the invention, the vehicle condition sensor may determine one or more of whether the vehicle is in motion, the speed of the vehicle, whether the vehicle is in gear or is in neutral, and whether the parking brake is applied. If only one vehicle condition is to be monitored by the sensor (for economy), then the output from the speedometer is preferable as it provides a more direct indication of whether the car is in motion. In this case, the response of the processor may be adjusted to suppress the video playback as soon as the speed meter reading is non-zero, or adjusted to have a built-in tolerance that allows video playback up to very low speeds of say three miles an hour. This would allow the video playback to remain active in cases where the driver of the vehicle is simply positioning the vehicle at home in their garage, in a car park, or on an unused street or lane and the risk to the driver and other road user's is minimal.

In cases where the output of the sensor represents a plurality of vehicle conditions (where there is sensor redundancy) then the response of the processor may be more sophisticated, and it may be appropriate to give different weightings to the different outputs. As discussed above, for example, on detecting a non-zero speed reading (or a speed reading above the low speed threshold) the processor should automatically act to disable the video output. On the other hand, the processor may not act immediately to disable the video output solely on detecting that the parking brake has been released, but may wait until the vehicle has been moved out of neutral into gear. By applying a more sophisticated processing to the sensor outputs, a better balance can be struck between safety and disruption to the video playback.

Once the video playback has been disabled, the processor in the present example also preferably switches an audio descriptor track into the audio output sent to the speakers. Audio descriptor tracks are supplemental signals provided to enhance the comprehension of video by the visually impaired. The producers of an audio descriptor track assume that the viewer is not able to detect enough detail in the video images in order to understand what is being portrayed by the video, and provide a moment by moment verbal description of the video content to aid understanding. When played in synchronisation with the playback of the video, this allows a viewer to follow the video using their auditory faculties rather than their visual faculties.

In the context of a television or video programme, such as a drama, documentary movie or soap opera, the audio descriptor track typically provides the viewer with a spoken description of all of the relevant information to understand the plot or message. This may include descriptions of characters, character movements, gestures or facial expressions, as well as any events also occurring in shot. The spoken description is often carefully created and timed so that it falls within the gaps in any spoken audio of characters or presenters in the video. The spoken audio of the audio descriptor track can however overlap the spoken audio of the main audio track, where necessary. Historically, the audio descriptor track has been provided as a secondary audio programme (SAP) channel, though increasingly such channels are used for providing an audio track in a second language to that of the main audio track (Spanish for example for US television broadcasting).

The audio descriptor track is often made available to viewers as a separate audio channel to the main audio accompanying the video. The viewer may then select playback of the channel in the normal way using dedicated buttons or control commands provided on their viewing device or remote control. As the information can be processed in the same way as a separate audio channel it can replace the main audio track, be played over the top of the main audio track, and indeed be played back at a different volume setting (louder or softer) to the main audio track depending on the receiver implementation and the viewer's preferences.

There are two different types of Audio Description streams, known as Broadcast Mixed and Received Mixed. In the Broadcast Mixed case, the audio descriptor track and the main audio track are mixed into a single stream which is broadcast to the receiver. The broadcast mixed audio stream is then available for playback, and can be processed in the receiver to allow the viewer to listen to either the main audio track only, or the main audio track and the audio descriptor track together. In the Received mixed case, the main audio track and the audio descriptor track are transmitted as separate streams or channels but are then mixed in the receiver if the viewer selects the audio description track. In other words, a Broadcast mix track will include the main audio track and audio descriptor while a receiver mix track will gave just the audio description.

In digital broadcasting or transmission schemes, including internet or mobile phone network streaming services, the audio descriptor track is distinguished from the main audio track by data descriptors. For example in the MPEG (Motion Picture Expert Group) standard, four audio type data descriptors are provided, including 0x00 for standard audio, 0x01 for audio effects; 0x02 for a hearing impaired audio track, and 0x03 for a visually impaired audio track. These audio types may be used differently by different broadcasters. For example some broadcasters use 0x00 for the Broadcast Mix audio descriptor track and 0x03 for the Received Mix audio descriptor track.

In the DVB standard, additional data descriptors are provided to classify the audio descriptor track, including a supplemental audio descriptor and editorial classification coding. In the DVB classification for example, the editorial classification 00001 is used to label the Audio description track for the visually impaired containing a spoken description of the visual content of the service.

The same classification is also provided for pre-recorded audio video content, such as DVDs, and Blu-Ray Discs. In this case, the audio and video data is arranged into multiple tracks and processed by the playback device. It is known therefore in receivers and video players to detect the data descriptor labels for both video and audio playback to ensure that the correct audio and video tracks are played back to the viewer.

Thus, in the present example, the processor of the entertainment device disables video playback when the vehicle is detected as being in motion, or being readied to drive off, in order not to take the attention of the driver of the vehicle away from the road. However, in order to preserve the entertainment quality of the audio/video playback the processor engages the audio descriptor track while the video is disabled, thereby ensuring that the driver can continue to follow the non-verbal information presented in the video image. The audio descriptor may be of both the broadcast or receiver mix types and be played in conjunction with the main audio track of the video content.

Once the vehicle is parked and secured, the processor may of course act to re-activate the video playback and switch the output to the speakers back to the main audio track automatically. Alternatively, the processor may wait for an input from the driver (though a button or device user interface feature) to indicate that it is an appropriate time to instigate normal audio and video playback. This avoids video playback recommencing when the vehicle is stopped intermittently at traffic signals and stop signs.

Figure 3:
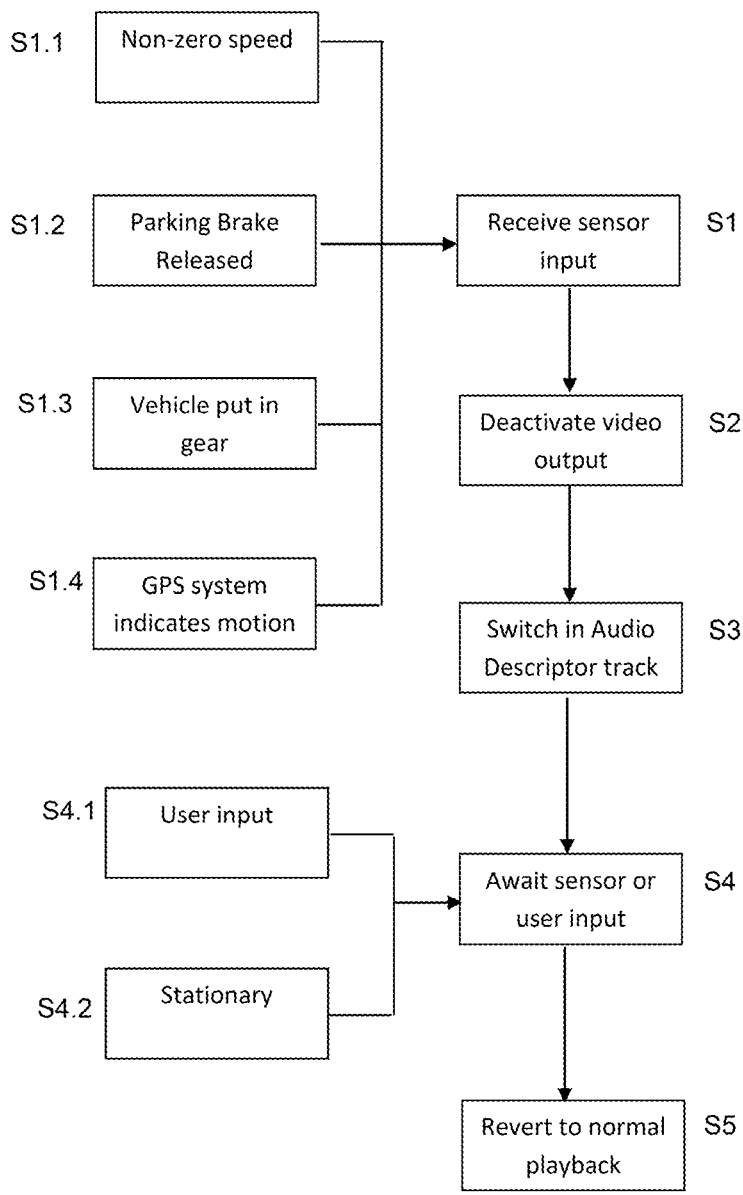
FIG. 3 is a flow chart illustrating the operation of the in-vehicle entertainment device shown in FIG. 1 and FIG. 2.

These processors will be better understood with reference to FIG. 3. In FIG. 3, the processor 20 is in an initial mode (step S1) awaiting input from the vehicle sensor 24. The input may be received in either of steps S1.1, S1.2, S1.3 or S1.4 indicating respectively the actions of detecting vehicle motion, release of the parking brake, the vehicle being put in gear, or a GPS output. The data from the sensor 24 may be stored in the memory 21. For example, the speed may be stored in memory and compared with a threshold low speed under which the processor takes no action. This speed limit may be very low such as three miles per hour or thereabouts. Also, GPS data, such as indication of vehicle location may be stored in memory so that the processor can calculate speed values from the position data, or simply compare the data points with one another to determine if there is a change in position. In all of these calculations, some tolerance is built in so that the processor does not react to speed or position outputs that simply represent uncertainty in the readings.

If vehicle sensor 24 output is received indicating that the vehicle is in motion, or is about to be driven, the processor activates a drive safety mode in which in step S2 the video output to the screen 3 is disabled, and in which in set S3 the audio playback at the speakers is switched to include an audio descriptor track.

Once in the drive safety mode, the processor 20 in step S4 waits for further input from sensor 24 or from a user input device to signal that normal playback may be resumed in step S5. If the vehicle sensor indicates in step S4.1 for example that the vehicle is no longer in motion then the processor may wait for a few seconds or minutes before reactivating normal playback of video. The processor may also wait for indication that the vehicle has been put in park or neutral gear, and that the handbrake has been applied for safety. Additionally, or alternatively the processor may respond to a user input from the user input device 7 to indicate that normal playback can now be resumed.

Although in the above example, the invention takes the form of a dedicated entertainment device for a vehicle, the technique of the invention could be applied to any playback device having a screen and a motion detector. For example, in smart phones or wirelessly enabled tablet devices or portable computers, GPS signals can be used to give an indication that the device is in motion, along with the vehicle in which the device is situated. Examples of the invention therefore include a driver safety mode in which the video playback function is disabled if the device is detected as being in motion, and in which the audio descriptor channel is subsequently activated to provide compensatory content.

A system has been described therefore that provides a vehicle entertainment device 1 having a driver safety mode and an enhanced audio playback function. In short, the device 1 detects whether the vehicle in which the entertainment device is situated is in motion, or if the driver is preparing to drive the vehicle momentarily. If either of these conditions is detected, the processor 20 acts to disable the video playback on the screen 3 of the entertainment device. At the same time, the processor 20 causes an audio descriptor track corresponding to the disabled video to be played through the speakers 4 of the entertainment device. The audio descriptor track is in addition to the main audio track accompanying the video and provides a verbal description of the content of the video.

Although the invention has been described with reference to a number of examples, these are intended to be purely illustrative, and are non-limiting on the invention defined in the claims. Where features of examples of the invention have been described in isolation it will be appreciated that they could also be used in combination with one another. Features of one embodiment may be used where appropriate with other features of another embodiment.

The invention claimed is:

1. A video entertainment device for a vehicle, the device comprising:
    a sensor for detecting that the vehicle is in motion, or is about to be driven; and
    a processor for activating a drive safety mode when the sensor determines that the vehicle is in motion, or is about to be driven, the processor further preventing deactivation of the drive safety mode for a predetermined amount of time of at least one minute to ensure that the vehicle is not only temporarily stopped at a traffic signal, whereby video playback is therefore not disabled during the predetermined amount of time, so that a driver is able to view the video playback during the predetermined amount of time;
    wherein in the drive safety mode the video playback is disabled and audio playback is switched to include an audio descriptor track, the audio descriptor track at least partly describing the non-verbal content of the disable video playback.

2. The video entertainment device of claim 1, wherein the sensor is coupled to the vehicle speed-o-meter, and the sensor determines that the vehicle is in motion if the speed-o-meter indicates a non-zero speed reading.

3. The video entertainment device of claim 1, wherein the sensor is coupled to the vehicle speed-o-meter, and the sensor determines that the vehicle is in motion if the speed-o-meter indicates a speed reading that is above a threshold value.

4. The video entertainment device of claim 1, wherein the sensor is coupled to the vehicle parking brake, and the sensor determines that the vehicle is about to be driven, if the sensor detects that the parking brake has been released.

5. The video entertainment device of claim 1, wherein the sensor is coupled to the vehicle gear system, and the sensor determines that the vehicle is about to be driven, if the sensor detects that the gear system has been shifted out of neutral into gear.

6. The video entertainment device of claim 1, wherein the sensor is coupled to a GPS (Global Positioning System) device.

7. The video entertainment device of claim 1, comprising a user input mechanism by which a user can deactivate the drive safety mode when the vehicle is stationary.

8. The video entertainment device of claim 1, wherein the device is installed in the vehicle.

9. The video entertainment device of claim 1, wherein the device is a mobile terminal.

10. A computer implemented method of controlling a screen and speakers of a video entertainment device for a vehicle, the method comprising:
    detecting with a sensor whether the vehicle is in motion, or is about to be driven;
    activating a drive safety mode when the sensor determines that the vehicle is in motion, or is about to be driven;
    preventing deactivation of the drive safety mode for a predetermined amount of time of at least one minute to ensure that the vehicle is not only temporarily stopped at a traffic signal, whereby video playback is therefore not disabled during the predetermined amount of time, so that a driver is able to view the video playback during the predetermined amount of time;
    wherein in the drive safety mode the video playback is disabled and audio playback is switched to include an audio descriptor track, the audio descriptor track at least partly describing the non-verbal content of the disable video playback.

11. The computer implemented method of claim 10, wherein the sensor is coupled to the vehicle speed-o-meter, and the sensor determines that the vehicle is in motion if the speed-o-meter indicates a non-zero speed reading.

12. The computer implemented method of claim 10, wherein the sensor is coupled to the vehicle speed-o-meter, and the sensor determines that the vehicle is in motion if the speed-o-meter indicates a speed reading that is above a threshold value.

13. The computer implemented method of claim 10, wherein the sensor is coupled to the vehicle parking brake, and the sensor determines that the vehicle is about to be driven, if the sensor detects that the parking brake has been released.

14. The computer implemented method of claim 10, wherein the sensor is coupled to the vehicle gear system, and the sensor determines that the vehicle is about to be driven, if the sensor detects that the gear system has been shifted out of neutral into gear.

15. The computer implemented method of claim 10, wherein the sensor is coupled to a GPS (Global Positioning System) device.

16. The computer implemented method of claim 10, comprising receiving an input from a user input mechanism to deactivate the drive safety mode when the vehicle is stationary.

17. A portable video entertainment device comprising:
    a screen for displaying video content and speakers for outputting audio content;
    a Global Positioning System (GPS) sensor for determining a location of the device; and
    a processor, wherein the processor is operable to:
        determine from the GPS sensor if the portable video entertainment device is in motion;
        if the device is in motion, to prevent video playback on the screen of the device and switch the audio output to include an audio descriptor track, the audio descriptor track at least partly describing non-verbal content of the disable video playback; and
        if the device is not in motion, to prevent the video playback on the screen of the device for a predetermined amount of time of at least one minute to ensure that a vehicle associated with the device is not only temporarily stopped at a traffic signal, whereby the video playback is therefore not prevented during the predetermined amount of time, so that a driver is able to view the video playback during the predetermined amount of time.

* * * * *